(12) United States Patent
Choi et al.

(10) Patent No.: US 8,553,525 B2
(45) Date of Patent: Oct. 8, 2013

(54) METHOD OF TRANSMITTING DATA BASED ON ADAPTIVE MODULATION AND CODING

(75) Inventors: Jin Soo Choi, Anyang-si (KR); Seung Woo Nam, Anyang-si (KR); Jong Min Kim, Anyang-si (KR); Jong Young Han, Anyang-si (KR); Han Gyu Cho, Anyang-si (KR); Jae Hoon Chung, Anyang-si (KR); Hyung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 248 days.

(21) Appl. No.: 12/682,037

(22) PCT Filed: Nov. 6, 2008

(86) PCT No.: PCT/KR2008/006525
§ 371 (c)(1),
(2), (4) Date: Apr. 7, 2010

(87) PCT Pub. No.: WO2009/061129
PCT Pub. Date: May 14, 2009

(65) Prior Publication Data
US 2010/0208678 A1    Aug. 19, 2010

(30) Foreign Application Priority Data
Nov. 7, 2007 (KR) .................. 10-2007-0113291

(51) Int. Cl.
*H04L 5/04* (2006.01)
*H04L 27/28* (2006.01)
*H04W 4/00* (2009.01)
*H04W 72/00* (2009.01)
*H04J 1/00* (2006.01)
*H04K 1/10* (2006.01)

(52) U.S. Cl.
USPC ........... 370/211; 370/329; 370/343; 375/260; 455/450

(58) Field of Classification Search
USPC ............ 370/211, 329, 343; 375/260; 455/450
See application file for complete search history.

(56) References Cited

U.S. PATENT DOCUMENTS

| | | | |
|---|---|---|---|
| 2005/0107036 A1* | 5/2005 | Song et al. ................... | 455/23 |
| 2006/0040619 A1* | 2/2006 | Cho et al. ...................... | 455/69 |
| 2006/0153112 A1* | 7/2006 | Lim et al. ..................... | 370/310 |
| 2007/0133480 A1* | 6/2007 | Nam et al. .................... | 370/335 |
| 2007/0207742 A1* | 9/2007 | Kim et al. ...................... | 455/69 |
| 2007/0213070 A1 | 9/2007 | Kim et al. | |
| 2007/0248002 A1 | 10/2007 | Kim et al. | |
| 2007/0286066 A1* | 12/2007 | Zhang et al. ................. | 370/208 |
| 2009/0097426 A1* | 4/2009 | Yin ............................... | 370/311 |

* cited by examiner

*Primary Examiner* — Alpus H Hsu
*Assistant Examiner* — Yee Lam
(74) *Attorney, Agent, or Firm* — McKenna Long & Aldridge LLP

(57) ABSTRACT

A method of transmitting data is provided. The method includes generating a frame, the frame comprising a data burst, a submap and a map wherein the submap indicates a resource allocation state of the data burst, and the map indicates a differential adaptive modulation and coding (AMC) level for the submap, and transmitting data using the frame, wherein the differential AMC level is information on change in an AMC level applied to the submap comparing with other submap in a different frame. High-speed data transmission is realized and limited radio resources can be more efficiently used.

4 Claims, 4 Drawing Sheets

METHOD OF TRANSMITTING DATA BASED ON ADAPTIVE MODULATION AND CODING

This application is a 35 U.S.C. §371 National Stage entry of International Application No. PCT/KR2008/006525, filed on Nov. 6, 2008, and claims priority to Korean Application No. 10-2007-0113291, filed on Nov. 7, 2007, each of which is hereby incorporated by reference in its entirety as if fully set forth herein.

TECHNICAL FIELD

The present invention relates to wireless communications and, more particularly, to a method of transmitting data based on adaptive modulation and coding (AMC).

BACKGROUND ART

Next generation multimedia wireless communication system is standardized to provide an efficient connection between a wire communication network and a wireless communication network and to provide an integrated service beyond simple wireless communication services such as mobile communication systems of the previous generation. Link adaptation may be employed to efficiently use a wireless link. Typically, the link adaptation includes a power control scheme and an adaptive modulation and coding (hereinafter referred to as "AMC") scheme. The power control scheme is a method to maintain transmission quality by controlling the power according to the state of the wireless link. The power control scheme is an efficient method in a system that is responsible for ensuring link quality under a fixed transmission rate such as voice services.

However, since multimedia data require various transmission rates, various transmission qualities, etc. according to the kinds of services, a new link adaptation of a concept different from existing voice-based services is required. The AMC scheme is an efficient link adaptation scheme for transmitting multimedia data, which adapts the transmission rate, not the transmission power, to channel environments.

Since the AMC scheme transmits data based on an appropriate transmission rate according to characteristics of the channel, the transmission power is fixed and the transmission rate is determined by an AMC level (also called a modulation and coding scheme (MCS) level). The AMC level is a level with respect to a predefined modulation and coding scheme. For example, high speed downlink packet access (HSDPA) supports a variety AMC levels using quadrature phase shift keying (QPSK), 16-quadrature amplitude modulation (16-QAM) and by efficiently puncturing a turbo code with a code rate of 1/3.

The AMC level is determined based on a carrier to interference and noise ratio (CINR), or based on a signal to interference ratio (SIR), in which a level showing the highest efficiency is selected. That is, under conditions where the channel environment is poor, QPSK having a low modulation index and a powerful channel coding scheme are used. Whereas, under conditions where the channel environment is good, a high modulation level and a low channel coding scheme are used. To support the AMC scheme, it is necessary that a base station should know information regarding the received CINR of a mobile station. In order to report the reception quality of the mobile station to the base station, channel quality information regarding the channel state is used.

Hereinbelow, downlink means communication from the base station to the mobile station, and uplink means communication from the mobile station to the base station. In general, the base station allocates radio resources to the mobile station. The radio resources become uplink resources on an uplink and downlink resources on a downlink. The radio resources allocated to the mobile station may be distributed in a frequency domain or in a time domain.

When the base station transmits a downlink frame to the mobile station, it is necessary that the base station should inform the mobile station of the AMC level of the frame at every frame. However, the channel environment is unlikely to be changed drastically, except for the case where the mobile station moves at high speed. It may be unnecessary signaling under limited radio resources that the base station fully informs the mobile station of the AMC level at every frame (full AMC level) even in the above case. Especially, since the AMC levels are different between the respective data regions or control regions included in the frame, the full AMC level may act as a higher overhead in the case where the AMC levels should be differently set according to the respective regions.

Thus, a method that can reduce the amount of radio resources used as the AMC levels is required.

DISCLOSURE OF INVENTION

Technical Problem

Accordingly, an object of the present invention is to provide a method of transmitting data based on adaptive modulation and coding (AMC).

Technical Solution

According to an embodiment of the invention, a method of transmitting data is provided. The method includes generating a frame, the frame comprising a data burst, a submap and a map wherein the submap indicates a resource allocation state of the data burst, and the map indicates a differential adaptive modulation and coding (AMC) level for the submap, and transmitting data using the frame, wherein the differential AMC level is information on change in an AMC level applied to the submap comparing with other submap in a different frame.

According to another embodiment of the invention, a method of transmitting an AMC level in an AMC scheme-based communication system is provided. The method includes transmitting an AMC level in a first transmission period, and transmitting a differential AMC level that represents an amount of change in the AMC level in a second transmission period. The AMC level and the differential AMC level are used to adaptively determine a coding and modulation scheme for a frame in the second transmission period.

Advantageous Effects

If transmitting a differential AMC level, it is possible to prevent a waste radio resources used to transmit an AMC level. Thus, high-speed data transmission is realized and limited radio resources can be more efficiently used.

MODE FOR THE INVENTION

Hereinafter, exemplary embodiments of the present invention will be described in detail with reference to the accompanying drawings so that this disclosure can be thorough and complete, and will fully convey the concept of the invention to those skilled in the art.

Figure 1:
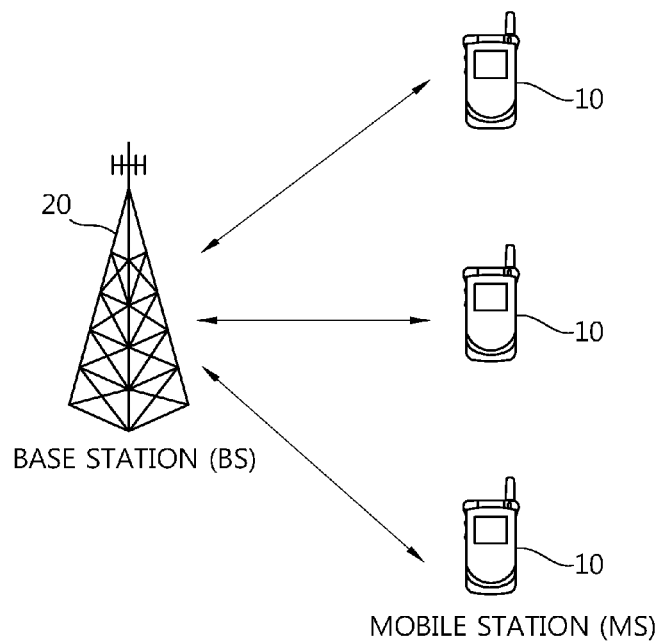
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and at least one user equipment (UE) 10. The BS 20 is generally a fixed station that communicates with the UE 10 and may be referred to as another terminology, such as a node-B, a base transceiver system (BTS), an access point, etc. There are one or more cells within the coverage of the BS 20. The UE 10 may be fixed or mobile, and may be referred to as another terminology, such as a mobile station (MS), a user terminal (UT), a subscriber station (SS), a wireless device, etc.

A downlink represents a communication link from the BS 20 to the UE 10, and an uplink represents a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Downlink and uplink transmissions can be made using different multiple access schemes. For example, orthogonal frequency division multiple access (OFDMA) may be used for downlink transmission, and single carrier-frequency division multiple access (SC-FDMA) may be used for uplink transmission.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. In these modulation schemes, signals received from multiple users are demodulated to increase capacity of the communication system.

Figure 2:
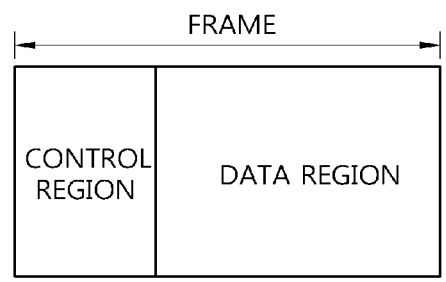
FIG. 2 shows an example of a frame structure, which may be applied to both frequency division duplex (FDD) and time division duplex (TDD) methods.

FIG. 2 shows an example of a frame structure, which may be applied to both frequency division duplex (FDD) and time division duplex (TDD) methods.

Referring to FIG. 2, the frame structure includes a control region and a data region.

The control region corresponds to a region that transmits only control information and is allocated to a control channel. The data region corresponds to a region that transmits data and is allocated to a data channel. The control channel corresponds to a channel that transmits the control information and the data channel corresponds to a channel that transmits user data. The control channel and the data channel may be composed of one frame. The control information may include various kinds of signals such as an acknowledgement/negative-acknowledgement (ACK/NACK) signal, a channel quality indicator (CQI), a precoding matrix index (PMI), a rank indicator (RI), a scheduling request signal, and the like, other than the user data.

Although only the control information is loaded in the control region, both the user data and the control information may be loaded in the data region. That is, in the case where the mobile station transmits only the control information, the control channel is allocated and, in the case where the mobile station transmits both the data and the control information, the data region is allocated. Exceptionally, even in the case where only the control information is transmitted, if the amount of control information is large or if the control information is not suitable to be transmitted through the control channel, radio resources may be allocated in the data region and transmitted.

The control region may include all control information transmitted to the mobile stations such as a system parameter, a preamble, and a ranging region. Moreover, the control region may include map information that indicates a resource allocation state of the data region.

Figure 3:
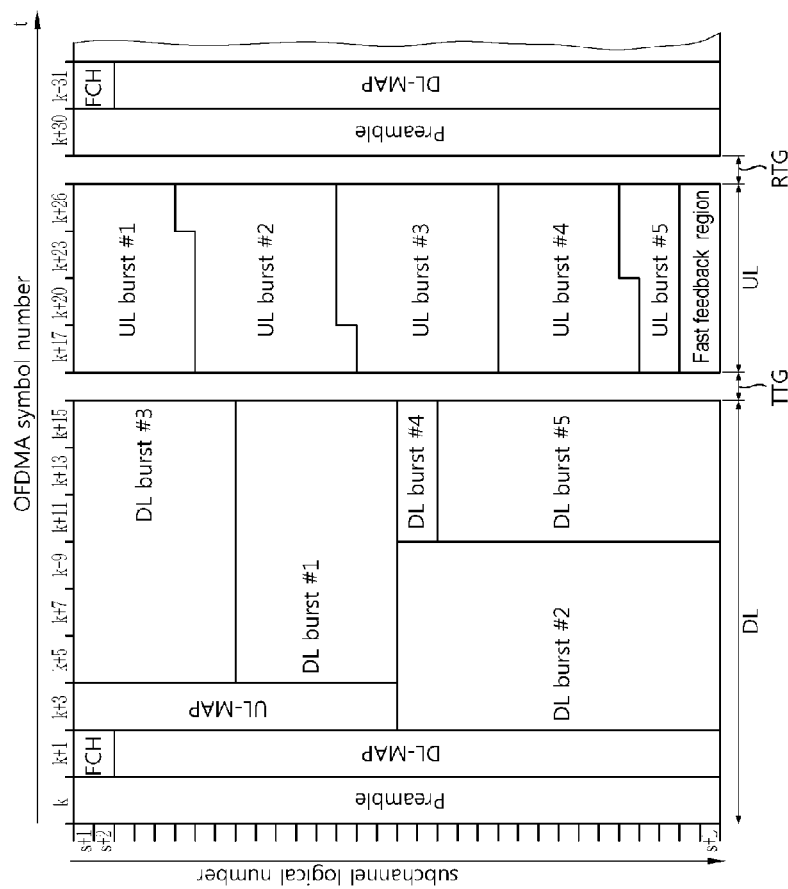
FIG. 3 shows another example of a frame structure.

FIG. 3 shows another example of a frame structure. The frame is a data sequence used by a physical specification for a fixed period of time, which may be an OFDMA frame.

Referring to FIG. 3, the frame includes a downlink frame and an uplink frame. Time division duplex (TDD) is a scheme in which the uplink and downlink transmissions occur at different times, while they share the same frequency. The downlink frame temporally precedes the uplink frame. A preamble, a frame control header (FCH), a downlink map (DL-MAP), and an uplink map (UL-MAP) may correspond to the control region of the downlink frame, and a downlink burst (DL-Burst) region may correspond to the data region. The uplink frame includes an uplink burst (UL-Burst) region.

A guard time for discriminating the uplink frame and the downlink frame is inserted into a middle portion of the frame (i.e., between the downlink frame and the uplink frame), and to a final portion (after the uplink frame). A transmit/receive transition gap (TTG) is a gap defined between a downlink burst and a subsequent uplink burst. A receive/transmit transition gap (RTG) is a gap defined between an uplink burst and a subsequent downlink burst.

The preamble is used for initial synchronization, cell search, frequency offset, and channel estimation between the base station and the mobile station. The FCH includes information regarding the length of a DL-MAP message and the coding scheme of the DL-MAP. The DL-MAP is a region where the DL-MAP message is transmitted. The DL-MAP message defines the access of a downlink channel. The DL-MAP message includes a configuration change count of a downlink channel descriptor (DCD) and a base station identifier (ID). The DCD describes a downlink burst profile applied to a current map. The downlink burst profile refers to characteristics of a downlink physical channel, and the DCD is periodically transmitted by the base station via a DCD message. The UL-MAP is a region where a UL-MAP message is transmitted. The UL-MAP message defines the access of an uplink channel. The UL-MAP message includes a configuration change count of an uplink channel descriptor (UCD) and an effective start time of uplink allocation defined by the UL-MAP. The UCD describes an uplink burst profile. The uplink burst profile refers to characteristics of an uplink physical channel, and the UCD is periodically transmitted by the base station via a UCD message.

Hereinbelow, a slot is a minimum available data allocation unit and defined by a time and a subchannel. In the uplink transmission, the subchannel may be constructed of a plurality of tiles. For example, the subchannel may be constructed of six tiles. In the uplink transmission, one burst may be constructed of three OFDM symbols and one subchannel. In partial usage of subchannels (PUSC) permutation, each tile may include four contiguous subcarriers over three OFDM symbols. The subcarrier of the PUSC may include eight data subcarriers and four pilot subcarriers.

In optional PUSC permutation, each tile may include three contiguous subcarriers over three OFDM symbols. The subcarrier of the optical PUSC may include eight data subcarriers and one pilot subcarrier. The tiles included in the subchannel may be distributed over the whole bandwidth. A bin includes nine contiguous subcarriers over an OFDM symbol. A band refers to a group of four rows of the bin.

The uplink frame partially includes a fast feedback region. The fast feedback region is a region allocated for more prompt uplink transmission than the general uplink data and may load a CQI or ACK/NACK signal. The fast feedback region may be located at any place of the link frame and not limited to the position or size shown in the figure.

The UL-MAP and the DL-MAP of the frame structure shown in FIG. 3 may be an excessive overhead. Thus, a structure, in which maps are divided according to the mobile stations having the same or similar channel state, is required.

Figure 4:
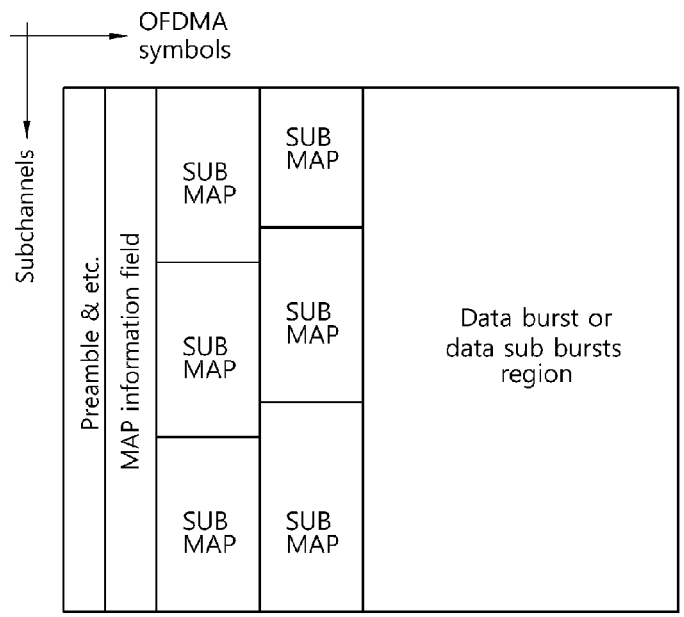
FIG. 4 shows still another example of a frame structure.

FIG. 4 shows still another example of a frame structure. The frame structure of FIG. 4 may be an uplink frame or a downlink frame.

Referring to FIG. 4, the frame includes a control region and a data region. The frame may be an uplink frame or a downlink frame. The control region includes a preamble, a map information field, and at least one submap. Differently from the frame structure of FIG. 3, the DL-MAP or the UL-MAP is substituted with the map information field and a plurality of submaps. The submap is a region including control information for a plurality of mobile stations having the same or similar channel state and indicates a resource allocation state of the respective data burst.

A plurality of submaps may be present according to the AMC levels. That is, a first AMC level may be applied to a first submap, and a second AMC level may be applied to a second submap. Of course, the term "submap" is not a limitation.

The preamble is used for initial synchronization, cell search, frequency offset, and channel estimation between the base station and the mobile station. The map information field includes control information regarding the length of a submap message and the level and size of AMC applied to the submap. The map information field may be called a map or a compressed map. The data region includes a plurality of data bursts.

Figure 5:
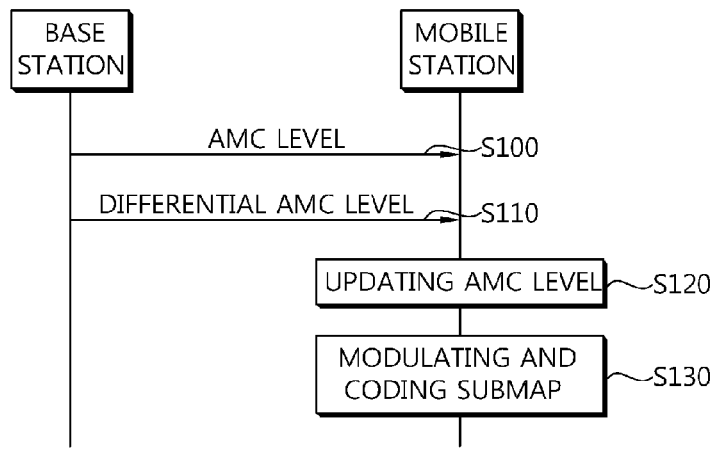
FIG. 5 is a flowchart illustrating a method of transmitting an AMC level in accordance with an exemplary embodiment of the present invention.

FIG. 5 is a flowchart illustrating a method of transmitting an AMC level in accordance with an exemplary embodiment of the present invention.

Referring to FIG. 5, the base station transmits an AMC level applied to a submap to the mobile station (S100). A plurality of submaps may be included in one frame. The transmitted AMC level may be a full AMC level. The full AMC level means that, if the AMC level is composed of sixteen AMC levels, any selected one of the sixteen AMC levels is transmitted. The base station collects the mobile stations having the same or similar channel state, modulates and codes the control information of the mobile stations, and transmits the AMC level to the mobile stations.

The base station transmits to the mobile station a differential AMC level applied to the control region (S110). The differential AMC level indicates how much an AMC level applied to a submap in the previous frame is changed to an AMC level applied to a submap in the current frame. For example, if the AMC level applied to the first submap among the plurality of submaps is 5 and the AMS level applied to the first submap in the transmission period of the next frame is 3, the differential AMC level is 2. That is, the difference between the AMC level applied to the first submap in the first frame transmission period and the AMC level applied to the first submap in the second frame transmission period refers to the differential AMC level. The first transmission period and the second transmission period do not always mean that they are contiguous. The can be separated from each other for one or more frames. The term 'first and second transmission periods' is used for convenience sake of description; however, it doesn't mean that the AMC level and the differential AMC level should be always transmitted periodically.

The mobile station updates the AMC level (S120). The mobile station receives an AMC level in the first frame transmission period and receives a differential AMC level in the second frame transmission period. The mobile station applies the differential AMC level to the AMC level, thus updating the AMC level.

The mobile station demodulates and decodes the submap using the AMC level and the differential AMC level (S130). As mentioned above, the submap is a control region that collects the mobile stations having the same or similar channel state, modulates and codes the control information of the mobile stations, and demodulates and decodes the control information by applying the same AMC level to the mobile stations. The submap is demodulated and decoded based on the updated AMC level.

When transmitting the full AMC level to the respective submaps, the radio resources used to transmit the AMC level are increased in geometric progression according to the number of submaps. For example, if the number of bits used in the AMC level is 6 and the number of submaps is 6 in one frame, 36 bits (6×6) are used to transmit the AMC level, which is a waste of limited radio resources. On the contrary, the number of the radio resources used to transmit the differential AMC level is smaller than the full AMC level. For example, if the number of bits used in the differential AMC level is 3 and the number of submaps is 6, 18 bits (3×6) are used to transmit the AMC level.

Figure 6:
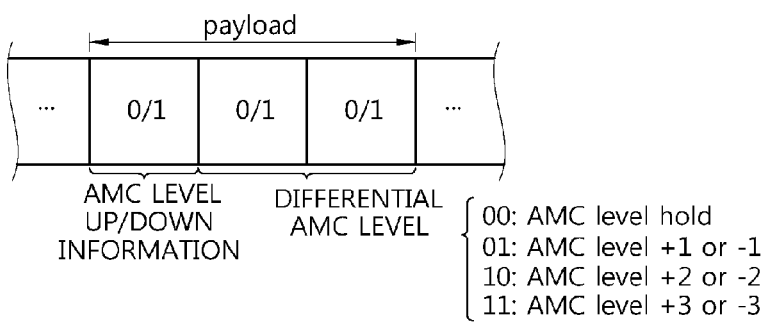
FIG. 6 shows a payload for transmitting a differential AMC level in accordance with an exemplary embodiment of the present invention.

FIG. 6 shows a payload for transmitting a differential AMC level in accordance with an exemplary embodiment of the present invention.

Referring to FIG. 6, the differential AMC level includes an absolute value of the amount of AMC level change and AMC level up/down information that indicates whether the absolute value is a positive or negative number. The amount of AMC level change and the AMC level up/down information may be represented by bit information. A first bit of the payload corresponds to the AMC level up/down information. If the bit information is 1, the amount of AMC level change may be represented by a positive number and, if the bit information is 0, the amount of AMC level change may be represented by a negative number, which may, of course, be changed.

Second and third bits of the payload corresponds to the amount of AMC level change that indicates how much the AMC level is increased or decreased compared to the AMC level transmitted in the previous period. The amount of AMC level change is an absolute value. That is, the amount of AMC level change has only a positive value. Whether the amount of AMC level change is a positive or negative number is known by the AMC level up/down information. Although the amount of AMC level change is represented by 2 bits, it is merely an example. That is, the amount of AMC level change may be represented by four quantized levels.

For example, assuming that the AMC level applied to a specific submap is increased by 2, the payload may be 110. Moreover, assuming that the AMC level is decreased by 3, the payload may be 011. In the case where there is no change in the AMC level, the payload may be 100 or 000. In this case, the first bit may be ignored.

Although the AMC level up/down information and the amount of AMC level change are shown as one bit and two bits, respectively, they are merely an example, and both may be represented by one bit.

Figure 7:
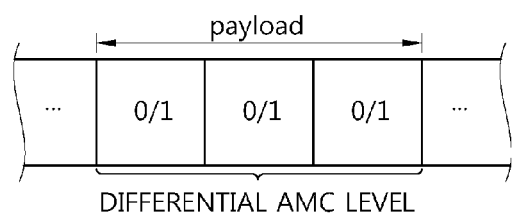
FIG. 7 shows a payload for transmitting a differential AMC level in accordance with another exemplary embodiment of the present invention.

FIG. 7 shows a payload for transmitting a differential AMC level in accordance with another exemplary embodiment of the present invention.

Referring to FIG. 7, the differential AMC level includes the amount of AMC level change that indicates how much an AML level is increased or decreased from an AMC level transmitted in the previous period. Although the differential AMC level is represented by 3 bits, the differential AMC level may be smaller or larger than 3 bits. Table 1 shows levels that can be represented by the differential AMC level of 3 bits:

TABLE 1

| AMC level of previous period | Differential AMC level (Payload bit information) | Updated AMC level |
|---|---|---|
| 6 | 4 (111) | 10 |
|  | 3 (110) | 9 |
|  | 2 (101) | 8 |
|  | 1 (100) | 7 |
|  | 0 (011) | 6 |
|  | −1 (010) | 5 |
|  | −2 (001) | 4 |
|  | −3 (000) | 3 |

Referring to Table 1, the differential AMC level may be represented by eight integers with 3 bits, i.e., integers from −3 (000) to 4 (111). If the differential AMC level is 111, AMC level 6 of the previous period is updated to AMC level 10, which is increased by 4. In the same manner, if the differential AMC level is 011, AMC level 6 is maintained at AMC level 6, which is increased by 0. Moreover, if the differential AMC level is 000, AMC level 6 of the previous period is updated to AMC level 3, which is decreased by 3.

In a communication system where the AMC level is transmitted at every interval of several milliseconds (ms), the channel state is rarely changed. That is, since the updated AMC level is not significantly changed compared to the AMC level previously transmitted, the transmission of the full AMC level in this situation is a waste of resources. When a transmitter transmits the differential AMC level, it is possible to reduce the number of bits used to transmit the AMC level. Thus, high-speed data transmission is realized and limited radio resources can be more efficiently used.

Although the number of bits used in the differential AMC level is 3, it is not a limitation and may be smaller or larger than 3 bits. Moreover, it is unnecessary that the differential AMC level corresponding to the number of bits should be −3 to 4, and it may be represented by a combination of integers from ?x to ?x+7. For example, if x=5, the differential AMC level may be any one of integers from −5 to 2.

Figure 8:
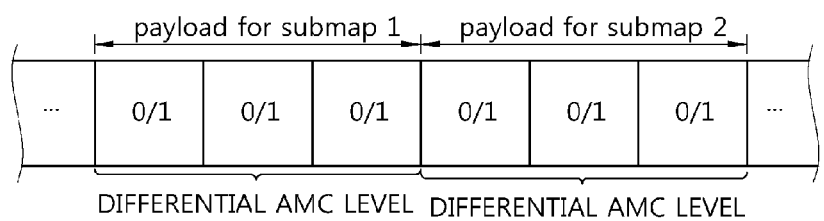
FIG. 8 shows a payload for transmitting an AMC level in accordance with still another exemplary embodiment of the present invention.

FIG. 8 shows a payload for transmitting an AMC level in accordance with still another exemplary embodiment of the present invention.

Referring to FIG. 8, the payload for transmitting the AMC level includes a plurality of differential AMC levels applied to a plurality of submaps. That is, a first differential AMC level is applied to a first submap, and a second differential AMC level is applied to a second submap. In the frame including the plurality of submaps shown in FIG. 5, the AMC levels of the respective submaps may be different, and thus the base station should transmit the differential AMC levels to the respective submaps.

Of course, in order to apply the differential AMC levels according to the submaps, it is first necessary that the AMC levels, which serve as a reference for updating the AMC level, should be known. The AMC levels of the submaps serving as the reference may be different from or equal to each other. The mobile station can update the AMC levels of the respective submaps using the differential AMC levels received according to the respective submaps.

Figure 9:
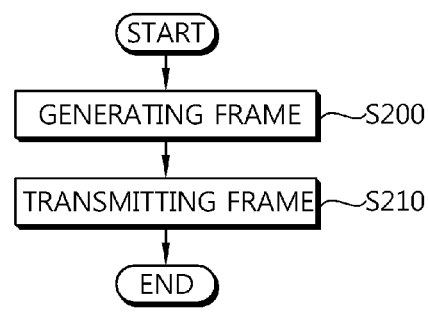
FIG. 9 is a flowchart illustrating a method of transmitting data in accordance with an exemplary embodiment of the present invention.

FIG. 9 is a flowchart illustrating a method of transmitting data in accordance with an exemplary embodiment of the present invention.

Referring to FIG. 9, a frame is generated (S200). The frame is constructed of a data burst, a submap indicating a resource allocation state of the data burst, and a map indicating a differential AMC level of the submap. The differential AMC level of the map represents an amount of change in the AMC level applied to the submap. A reference for measuring the change in the AMC levels may be a single frame unit or several frame units. That is, the AMC level may be changed, and the time interval that the AMC level is changed is an implementation problem.

The differential AMC level may be the amount of the AMC level change. Otherwise, the differential AMC level may be an absolute value of the amount of AMC level change and AMC level up/down information that indicates whether the absolute value is a positive or negative number. The transmitter modulates and codes the submap based on the AMC level to which the differential AMC level is applied.

The submap may be a plurality of submaps. If so, the differential AMC levels corresponding to the number of submaps may be transmitted. The differential AMC levels may be included in the map. The transmitter generates a frame from the thus obtained map, submap and data burst. The thus generated frame is transmitted by the transmitter (S210). The frame may be transmitted to the uplink or downlink.

The above-described functions may be performed by software programmed to perform the above function, a microprocessor, a controller, a microcontroller, a processor such as an application specific integrated circuit (ASIC) according to the program code, etc. The design, development and implementation of the code will become apparent to those skilled in the art based on the description of the present invention.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

The invention claimed is:

1. A method of transmitting data, the method comprising:
grouping a plurality of mobile stations having a same channel state;
generating a frame, the frame comprising a preamble, a map, a submap and a data burst, wherein the submap indicates a resource allocation state of the data burst, and the map indicates an adaptive modulation and coding (AMC) level for the submap; and
transmitting data using the frame to the plurality of mobile stations;
wherein the AMC level for the submap is determined by a channel state of the plurality of mobile stations, and
wherein the submap is a region including control information for the plurality of mobile stations having the same channel state and the control information is encoded using the AMC level indicated by the map, and
wherein the map is transmitted through fixed radio resources in the frame, the fixed radio resources comprising an orthogonal frequency division multiplexing (OFDM) symbol contiguous to a first OFDM symbol where the preamble is transmitted, and
wherein the map comprises differential AMC level, the differential AMC level is information on change in the AMC level applied to the submap comparing with other submap in a previous frame, and wherein the differential AMC level comprises a value of the amount of change in the AMC level applied to the submap and AMC level up/down information that indicates whether the value is a positive or negative number.

2. The method of claim 1, wherein the differential AMC level is an amount of AMC level change that represents an amount of change in the AMC level applied to the submap.

3. The method of claim 1, wherein the frame comprises a plurality of submaps and the map indicates the differential AMC level for each of the plurality of submaps.

4. A method of transmitting an adaptive modulation and coding (AMC) level in an AMC scheme-based communication system, the method comprising:
grouping a plurality of mobile stations having a same channel state;
transmitting a first frame to the plurality of mobile stations in a first transmission period, the first frame comprising a first data burst, a first submap and a first map wherein the first submap indicates a resource allocation state of the first data burst, and the first map indicates an AMC level for the first submap; and
transmitting a second frame to the plurality of mobile stations in a second transmission period, the second frame comprising a second data burst, a second submap and a second map wherein the second submap indicates a resource allocation state of the second data burst, and the second map indicates an AMC level for the second submap,
wherein the AMC level for the first submap and the AMC level for the second submap are determined by channel states of the plurality of mobile stations, and
wherein the first submap and the second submap are regions including control information for the plurality of mobile stations having the same channel state, and
wherein the first map and the second map are transmitted through fixed radio resources in corresponding frames, the radio resources comprising an orthogonal frequency division multiplexing (OFDM) symbol contiguous to a first OFDM symbol where a preamble is transmitted,
wherein the first map indicates the AMC level for the first submap with a full AMC level that represents any selected one of all AMC levels
and the second map indicates the AMC level for the second submap with a differential AMC level that represents an amount of change in the AMC level for the second submap comparing with the AMC level for the first submap,
and the differential AMC level comprises a value of the amount of change in the AMC level for the second submap and AMC level up/down information that indicates whether the value is a positive or negative number.

* * * * *